J. BIRKENHEAD.

Spinning-Ring and Mechanism for Adjusting the Same.

No. 8,973. Reissued Nov. 18, 1879.

Witnesses
S. N. Piper
W. W. Lord

Inventor
John Birkenhead.
by attorney
R. H. Eddy

N. PETERS, PHOTO-LITHOGRAPHER, WASHINGTON, D. C.

UNITED STATES PATENT OFFICE.

JOHN BIRKENHEAD, OF MANSFIELD, MASSACHUSETTS.

IMPROVEMENT IN SPINNING-RINGS AND MECHANISMS FOR ADJUSTING THE SAME.

Specification forming part of Letters Patent No. 42,829, dated May 24, 1864; Reissue No. 3,557, dated July 20, 1869; Reissue No. 8,973, dated November 18, 1879; application filed May 17, 1879.

*To all whom it may concern:*

Be it known that I, JOHN BIRKENHEAD, late of Ilion, of the county of Herkimer and State of New York, but now of Mansfield, of the county of Bristol and State of Massachusetts, have invented a new and useful Improvement in Spinning-Rings and Mechanism for Adjusting the Same, which I do hereby declare to be fully described in the following specification and represented in the accompanying drawings, of which—

Figure 1:
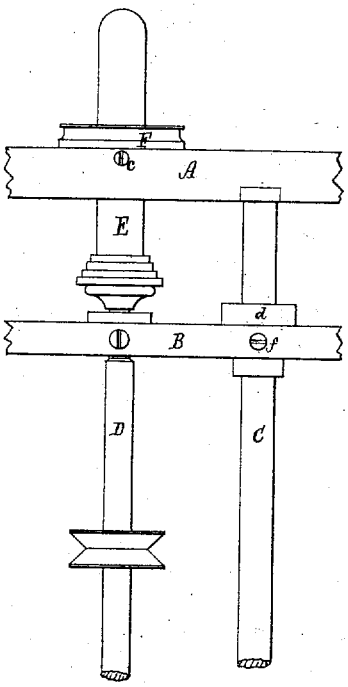
Figure 7:
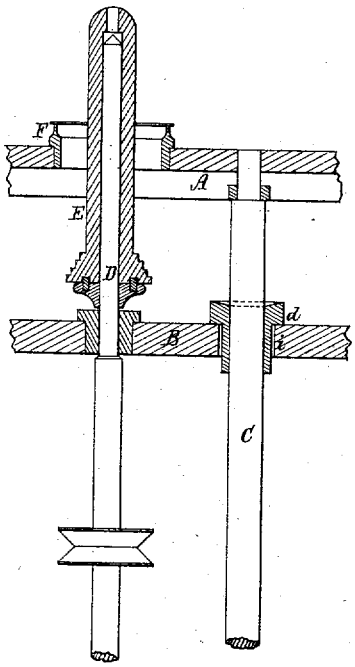
Figure 2:
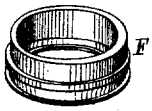
Figure 3:
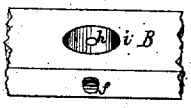
Figure 4:
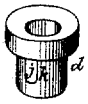
Figure 5:
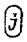
Figure 6:
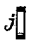

Figure 1 is an elevation, and Fig. 7 a vertical section, of certain parts of a spinning-frame with the invention applied thereto. Fig. 2 is a perspective view of one of the improved rings, it being shown as inverted. Fig. 3 is a view in perspective of a portion of the bolster-rail, such figure showing the hole for reception of the lifter-rod bush to be hereinafter described, and which is also shown in perspective in Fig. 4. Fig. 5 is a side view, and Fig. 6 an edge view, of the gib employed in connection with the said bush.

In constructing ring-rails for spinning-frames great difficulty is often experienced in getting the holes for reception of the ring-shanks concentric with the spindles which are to revolve within such holes and rings. When a hole of the kind is not concentric with its spindle and the ring is concentric with the hole, the traveler, in its course around the race of the ring, is thereby caused to bear unequally on the ring, so as to wear it unevenly, the traveler having imparted to it motions whereby both inequality of tension and unevenness of the yarn spun result.

The ring-holes may be eccentric originally with reference to their spindles, or may become so by some disturbing cause.

The required concentricity of each ring and its spindle is effected by the invention or improvement hereinafter described, consisting in, first, a spinning-ring having an eccentric bearing, substantially as hereinafter explained; second, the combination of a spinning-frame spindle, a ring-rail, and a ring having an eccentric revoluble bearing for effecting in the revolution of such bearing about the axis of the spindle concentricity of the ring and spindle; third, the combination, with the ring-rail, lifter-rod and its guide-bush, and the sustaining-rail of the latter, of a gib applied to the bush, and of screws screwed into the bush-sustaining rail, one of such screws being to operate against the gib and the other against the bush, as hereinafter explained; fourth, the combination of a spinning-frame spindle and its ring, ring-rail, and means of effecting concentricity of the ring and spindle, as described, with mechanism for readjusting the ring-rail, as explained, in consequence of its becoming deflected from its normal or proper position through wear of its lifter-rod or the bush thereof, as set forth.

In Figs. 1 and 7 of the drawings, A represents the ring-rail; B, the bolster-rail; C, the lifter-rod, and D a spindle, having upon it a bobbin, E.

Figure 8:
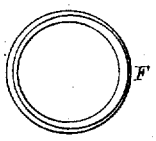

The shank or part of the ring F which is to enter the hole in the rail is provided with an eccentric bearing—that is, the outer cylindrical surface of such shank is eccentric with respect to its bore or inner cylindrical surface, which is concentric with the race. Fig. 8 is a bottom view of a ring so made.

The degree of eccentricity of the bearing part of the shank of the ring with reference to the race may be only sufficient to compensate for any ordinary eccentricity of the ring-receiving pole.

On the ring being inserted in a hole of the rail for its reception, and if such hole should be accidentally eccentric relatively to the spindle, the ring is to be revolved in the hole until, by means of the eccentricity or eccentric bearing of the ring-shank, such ring may have its race brought or adjusted into concentricity with the spindle or its axis. The adjustment having been effected, the ring is to be secured in position by means of a set-screw, *c*, screwed into the rail and against the shank of the ring.

Another difficulty experienced in ring-spinning frames is caused by wear of the lifter-rod C, or of its bolster or bush *d*, while the rod may be in movement in such bush, the wear being generally on that side of the rod which is toward the front of the spinning-frame, it causing the ring-rail to lean forward more or less, thereby producing eccentricity of the rings relatively to their spindles.

Figure 9:
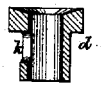

The drawings represent means of readjusting the ring-rail in order to carry its rings back into concentricity with the spindles, such being, by means of a gib, *j*, placed in a slot or aperture, *k*, made through the bush from its bore outwardly, as shown in Fig. 9, which is a vertical and longitudinal section of the bush.

Figure 10:
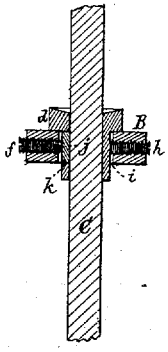

Fig. 10 is a vertical and transverse section of the lifter-rod, the bush, and the bolster-rail, such section showing the gib and two adjusting-screws, *f h*, screwed into the rail. One of these screws bears at its inner end against the bush, while the other at its inner end bears against the gib, which rests against the lifter-rod, the hole *i* in the rail B for receiving the shank of the bush fitting loosely thereto, or having a diameter somewhat larger than that of the shank.

Should the lifter-rod or its bush become worn so as to cause the rod to run too loosely in the bush, the difficulty above mentioned as resulting therefrom may be corrected by means of one or both the set-screws and the gib. Thus, by the means described, concentricity of the ring and spindle may be effected in case of their becoming eccentric relatively to each other.

While the concentricity of each of the rings with its spindle may not be entirely effected by the gib and screws operating therewith and with the bush, as described, the eccentric bearing to each ring enables the ring, on being revolved sufficiently, to be still further adjusted relatively to the spindle.

What I claim, therefore, as my invention is as follows, viz:

1. A spinning-frame ring having an eccentric bearing, substantially as and for the purpose set forth.

2. The combination of a spinning-frame spindle, a ring-rail, and a ring having an eccentric revoluble bearing for effecting, in the revolution of such bearing about the axis of the spindle, concentricity of the ring and spindle.

3. The combination, with the ring-rail lifter-rod and its guide-bush and the sustaining-rail of the latter, of a gib applied to the bush, and of screws screwed into the bush-sustaining rail, one of such screws being to operate against the gib and the other against the bush, as explained.

4. The combination of a spinning-frame spindle and its ring, ring-rail, and means of effecting concentricity of the ring and spindle, as described, with mechanism for readjusting the ring-rail, as explained, in consequence of its becoming deflected from its normal or proper position through wear of its lifter-rod or the bush thereof, as set forth.

JOHN BIRKENHEAD.

Witnesses:
R. H. EDDY,
W. W. LUNT.